United States Patent
Furusawa et al.

[11] Patent Number: 5,751,296
[45] Date of Patent: May 12, 1998

[54] VIDEO PRESENTATION SYSTEM

[75] Inventors: Toyoaki Furusawa; Minehiro Matsumura; Toshihiro Nishimura, all of Kawasaki, Japan

[73] Assignee: Fujitsu Limited, Kawasaki, Japan

[21] Appl. No.: 655,449

[22] Filed: May 30, 1996

[30] Foreign Application Priority Data

Oct. 19, 1995 [JP] Japan .................................. 7-271562

[51] Int. Cl.$^6$ .................................. G06F 15/00
[52] U.S. Cl. .................................. 345/520
[58] Field of Search .................................. 345/501, 520, 345/522, 526

[56] References Cited

U.S. PATENT DOCUMENTS 5,321,811  6/1994  Kato et al. .................. 345/520

FOREIGN PATENT DOCUMENTS

| 0 355 697 | 2/1990 | European Pat. Off. . |
| 2244896 | 7/1989 | United Kingdom . |
| 2211689 | 12/1991 | United Kingdom . |
| 88/06775 A1 | 9/1988 | WIPO . |
| WO 95/11566 | 4/1995 | WIPO . |

*Primary Examiner*—Phu K. Nguyen
*Attorney, Agent, or Firm*—Staas & Halsey

[57] ABSTRACT

A video presentation system is provided which permits a process in which, when an object in motion video image is handled, an action relating to the object is executed, without increasing load on a central processing unit or a memory. Subject-of-operation information, which defines objects to be handled by a user in relation to each of frames of video data at a transitional phase of time-varying motion of each object, is stored in video operation information retaining means, and when a user operation takes place, the frame position of a currently reproduced video image is acquired from video driving/processing means while screen coordinates of the object are acquired from a coordinates specifying device. Based on the acquired data, video operation information processing means searches the subject-of-operation information to identify the object handled by the user. The subject-of-operation information retains only information associated with each transitional phase of motion of the object, whereby the size of information can be reduced, thus permitting the object specifying process and a like process to be executed at high speed.

4 Claims, 6 Drawing Sheets

VIDEO PRESENTATION SYSTEM

BACKGROUND OF THE INVENTION (1). Field of the Invention

The present invention relates to a video presentation system, and more particularly, to a video presentation system applied to an interactive multimedia system wherein a user is allowed to directly handle an object in a video image displayed on a video display unit to cause an action such as on-screen display of data relating to the object or a switching to another scene.

As a result of recent improvement and development of video- and audio-based input/output devices and software, the multimedia applications market is rapidly expanding and also there has been an increasing demand for improvement in the function and performance of such applications.

(2). Description of the Related Art

Video media used in conventional multimedia applications generally provide an interactive feature for a still image whereby, when a certain part on a display screen is specified, data relating to the specified part is displayed or a switching to another screen takes place. For a motion video image, however, video media are generally insensitive to user's direct handling and serve merely as a component for reproducing video data as they are given.

It has not been an impossibility to give an interactive feature to video media; however, in order to achieve synchronization between video reproduction and user operation-sensitive interactivity, that is, in order to permit a recognition as to which part in a reproduced video image has been handled, only available options are to either employ a time monitoring process or set interactivity for each of video frames.

However, the method requiring a time monitoring process exerts a bad influence on the performance of video reproduction in respect of timing process or the like, and the method of setting interactivity for each of video frames requires a vast amount of setting information, imposing heavy restrictions on the capacity of storage device. With the conventional methods, therefore, even if an attempt is made to synchronize full-motion video reproduction at a rate of 30 frames per second with a user operation with respect to an object moving in a video image, a heavy load is applied on the central processing unit or the memory, posing a problem in that motion video cannot be smoothly reproduced, for example.

SUMMARY OF THE INVENTION

An object of the present invention is to provide a video presentation system in which the load on a central processing unit or a memory is not great and which, when an object in a reproduced video image is handled, permits on-screen display of data relating to the object or a switching to another scene.

To achieve the above object, there is provided a video presentation system including video driving/processing means for carrying out a process for displaying video data at a video display unit, a coordinates specifying device used by a user to specify a subject of operation such as an object in a video image, and presentation controlling/processing means for carrying out processes including a switching to a scene relating to the subject of operation specified by the coordinates specifying device. The video presentation system further comprises video operation information retaining means for retaining subject-of-operation information defining subjects of operation to be handled by the user on video images corresponding to the video data, and video operation information processing means for searching the subject-of-operation information for a subject of operation handled by the user, based on a frame position of the video data currently reproduced by the video driving/processing means and the screen coordinates of the subject of operation specified by the coordinates specifying device, to thereby detect the subject of operation handled by the user.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An outline of the present invention will be first described with reference to a drawing.

Figure 1:
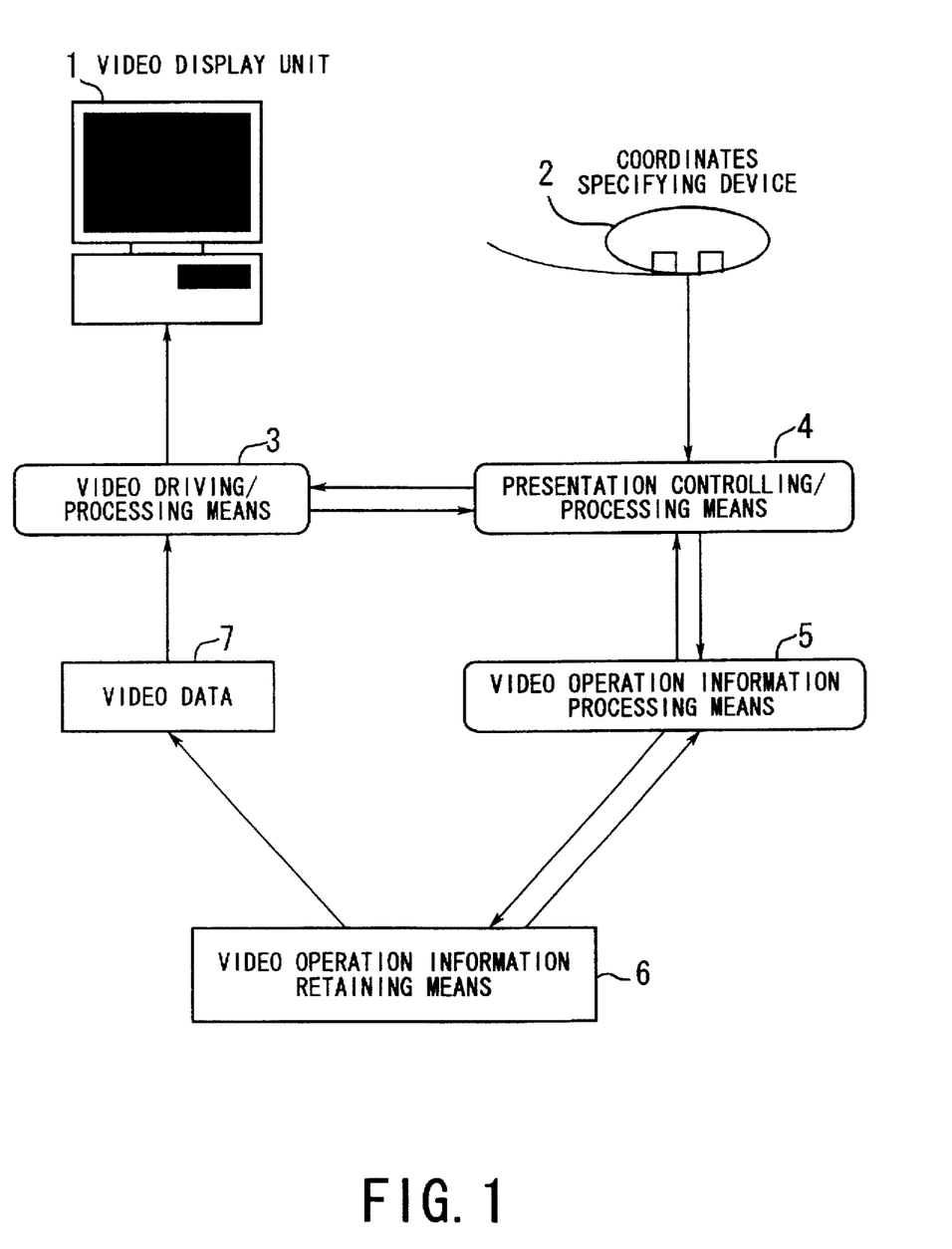
FIG. 1 is a diagram illustrating the theoretical configuration of a presentation system according to the present invention.

FIG. 1 illustrates the theoretical configuration of a presentation system according to the present invention.

The presentation system which allows a user to handle a subject of operation, such as an object in a video image, to switch to a scene relating to the subject of operation comprises a video display unit 1 for outputting a video image to an area on its screen, a coordinates specifying device 2 for outputting screen coordinates of a point of operation when the operation is performed by the user on the screen of the video display unit 1, video driving/processing means 3 for carrying out a process of loading video data 7 to be output to the video display unit 1, or starting, stopping, reversing or fast-forwarding the reproduction of the video data, and presentation controlling/processing means 4 for carrying out a process of reproducing the video data or interpreting the user operation to switch scenes, in accordance with contents of presentation; in addition to these elements, the present invention further comprises video operation information processing means 5 and video operation information retaining means 6. The video operation information processing means 5 detects the subject of operation handled by the user, in accordance with a frame position of video data currently reproduced by the video driving/processing means 3 and the screen coordinates of the subject of operation specified by the coordinates specifying device 2. The video operation information retaining means 6 retains subject-of-operation information about names of reproduced video data and subjects of operation in the video data.

With a reproduced video image displayed in an area on the screen of the video display unit 1, when the user selects a certain subject of operation in the video image by using the coordinates specifying device 2, the coordinates specifying device 2 notifies the presentation controlling/processing means 4 of the coordinates on the screen of the video display unit 1 where the select operation has been made by the user. The presentation controlling/processing means 4 requests the frame position of a currently reproduced video image from the video driving/processing means 3 and acquires the frame position. Then, based on the previously acquired screen coordinates and the frame position, the presentation controlling/processing means 4 requests acquisition of an identifier of the handled subject from the video operation information processing means 5. At this time, the video operation information processing means 5 may be notified of a time interval identifier specifying to which scene in the video data the currently reproduced video image corresponds, along with the screen coordinates and the frame position. In this case, the range of search for the subject of operation can be restricted only to the scene concerned, thus permitting high-speed operation.

The video operation information processing means 5 examines subject-of-operation information recorded in that time interval information in the video operation information retaining means 6 which is specified by the time interval identifier. If, in certain subject-of-operation information, the notified frame position falls within the range between the frame of the first path information and that of the last path information, contour information about the subject of operation at the frame position concerned is obtained from the recorded path information, and if this contour information contains the notified screen coordinates, an identifier of the subject of operation is acquired and is returned to the presentation controlling/processing means 4.

The thus-returned subject-of-operation identifier and the current time interval identifier can specify with respect to which subject of operation in which scene the select operation has been made, and accordingly, based on this information, the presentation controlling/processing means 4 finds and then executes a process linked to that subject of operation in the scene concerned. If the linked process is to switch to another scene, the frame range for the scene to be switched to is specified to carry out video reproduction by mean of the video driving/processing means 3, and if the linked process specifies another task, the recorded task is executed.

Thus, when a select operation is made with respect to a subject of operation in a reproduced video image, the process linked to this subject of operation is called and executed.

The following is a description of an embodiment according to the present invention which is applied, for example, to a presentation system whereby a user is allowed to move about within a building in virtual reality mode. For such application of the invention, video data of various spots in a building may be obtained in advance by using a video camera and stored so that the data can be distinguished from one another in respect of various scenes in the building, and the presentation system may be an interactive system which, when the user makes a select operation with respect to a door in a currently reproduced video image, for example, performs a switching of scenes to reproduce video data showing the door being opened and the space inside the door or displays information relating to the door, for example, the model number, material, dimensions and like data of the selected door.

Figure 2:
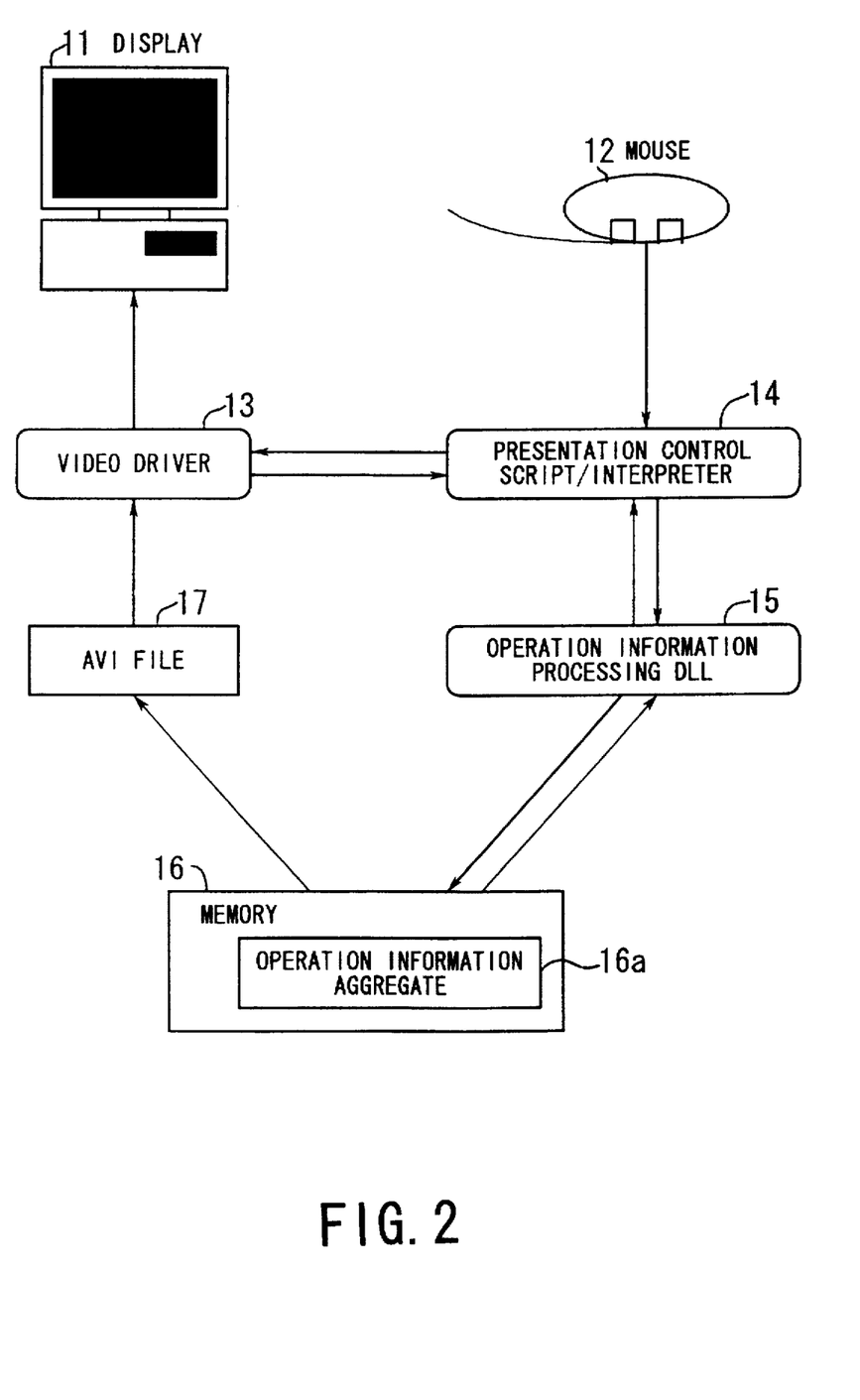
FIG. 2 is a diagram illustrating the configuration of a presentation system according to one embodiment of the present invention.

FIG. 2 illustrates the configuration of a presentation system according to the embodiment of the present invention.

In FIG. 2, reference numeral 11 denotes a display for displaying a video image on its screen, and 12 denotes a mouse for detecting the screen coordinates of a point of select operation performed by the user on the screen of the display 11 which is reproducing video data. A video driver 13 loads data from a video file and displays the data on the display 11. A presentation control script/interpreter 14 comprises a control script describing presentation sequence and an interpreter for executing the script. An operation information processing DLL (dynamic link library) 15 detects a selected subject of operation based on the time associated with a currently reproduced image, that is, a frame position, by means of the screen coordinates information output from the mouse 12. Reference numeral 16 denotes a memory in which is loaded an operation information aggregate 16a indicating which subjects appear in which scenes and also what motions the subjects make. Reference numeral 17 denotes a video file of, for example, AVI (audio visual interleaved) format containing video data of actual images.

In the control script of the presentation control script/interpreter 14 is described a process to be executed when screen coordinates are input from the mouse 12 as a result of user operation. For example, while advancing along a corridor in a building, the user may reach the parting of right and left passageways. The control script describes case-dependent stories whereby the scene is switched to show the scene of turning to the right and advancing the right passageway when the right-hand corner is selected with the mouse 12 or the scene is switched to show the scene of turning to the left and advancing the left passageway when the left-hand corner is selected.

The presentation control script/interpreter 14 executes the following three processes:

When a user operation takes place, screen coordinates are supplied from the mouse 12. At this time, the control script/interpreter inquires of the video driver 13 which frame of video image is being reproduced, and acquires a current frame number from the video driver 13.

Using a set of the frame number acquired from the video driver 13 and the screen coordinates, the control script/interpreter calls the operation information processing DLL 15 for processing the operation information, and acquires a name identifying a subject which is the selected subject of operation, that is, an identifier.

The control script/interpreter searches for a condition in accordance with the identifier of the subject, which is returned from the operation information processing DLL 15, and the current scene, and executes a script matching the condition.

The operation information processing DLL 15 has the following nine basic interfaces for processing the video operation information: HIDF FAR PASCAL_export MIDRV_LoadIDF(LPCSTR lpszIdfFile-Name); viod FAR PASCAL_export MIDRV_PurgeIDF(HIDF hIDF); LPCSTR FAR PASCAL_export MIDRV_GetVideoFileName (HIDF hIDF); int FAR PASCAL_export MIDRV_FindScene(HIDF hIDF, LPCSTR sceneName); LPCSTR FAR PASCAL export_MIDRV_GetName(HIDF hIDF, int sceneindex); LONG FAR PASCAL_export MIDRV_GetStartTime(HIDF hIDF, int sceneindex); LONG FAR PASCAL_export MIDRV_GetEndTime(HIDF hIDF, int sceneindex); int FAR PASCAL_export MIDRV_GetNumberOfScenes(HIDF hIDF); LPCSTR FAR PASCAL_export MIDRV_PickXY(HIDF hIDF, int sceneIndex, LONG time, int x, int y);

"LoadIDF" is a function for reading a file in which video operation information is defined and loading the contents of the file into the memory 16, wherein the argument is the filename and the returned value is a pointer pointing at the operation information aggregate 16a. "PurgeIDF" is a function for removing the loaded operation information aggregate 16a from the memory 16, and the argument is a pointer pointing at the operation information aggregate 16a. The function "GetVideoFileName" is an interface for acquiring the name of a video data file to be reproduced by the video driver 13 from the operation information aggregate 16a as the argument. The function "FindScene" is an interface for searching the operation information aggregate 16a as the argument for a scene with the name "sceneName", that is, a time interval, and returning its identification number. The function "GetName" is an interface for obtaining the time interval name (scene name) based on the identification number of the time interval in the operation information aggregate 16a. The functions "GetStartTime" and "GetEndTime" are interfaces for obtaining a start frame number and an end frame number, respectively, based on the identification number of the time interval in the operation information aggregate 16a. The function "GetNumberOfScene" is an interface for determining how many scenes are set in one video data file, that is, the number of time intervals in the operation information aggregate 16a. The function "PickXY" is an interface for acquiring the name of the subject (handled object) having a contour containing the XY coordinates, based on the time interval name of the scene currently reproduced, the frame number and the screen coordinates of the operation point.

Figure 3:
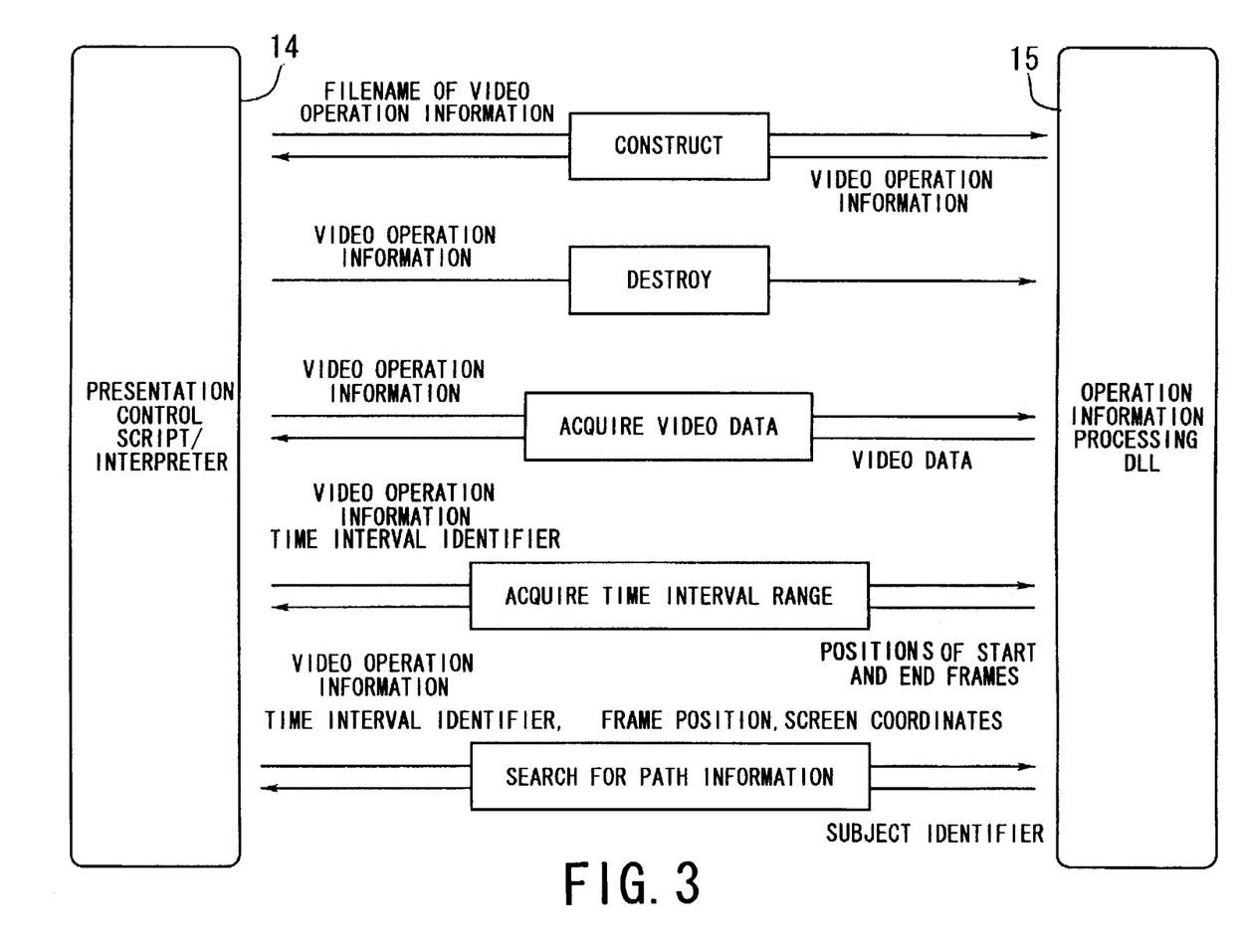
FIG. 3 is a chart illustrating the interfacing functions of an operation information processing DLL.

The aforementioned various functions of interfacing between the presentation control script/interpreter 14 and the operation information processing DLL 15 can be summarized as follows:

FIG. 3 schematically illustrates the interfacing functions of the operation information processing DLL.

The function "CONSTRUCT" is to construct the operation information aggregate 16a in the memory 16 by specifying a video operation file with respect to the operation information processing DLL 15 from the presentation control script/interpreter 14, and the identifier (pointer or handle) for making reference on the memory 16 to the operation information aggregate 16a loaded in the memory 16 is returned to the presentation control script/interpreter 14.

The function "DESTROY" is to remove the operation information aggregate 16a from the memory 16 so that the memory space may be reusable, wherein the operation information aggregate 16a in the memory 16 is cleared by using the identifier returned at the time of construction.

The function "ACQUIRE VIDEO DATA" is to acquire the video data file specified in the video operation information on the memory 16 by specifying the video operation information in the operation information aggregate 16a, and the identifier (filename) of the video data file is returned.

The function "ACQUIRE TIME INTERVAL RANGE" is to search the time interval information set in the operation information aggregate 16a for matching time interval information, by specifying the video operation information of the operation information aggregate 16a and the time interval identifier which is the name of a scene set in the video image, and the positions of the start frame and end frame of the matching time interval are returned.

The function "SEARCH FOR PATH INFORMATION" is to return the subject identifier of subject-of-operation information indicating which subject has been operated by the user, by specifying the video operation information of the operation information aggregate 16a, the identifier of the time interval information, the frame position at which the user operation took place, and the screen coordinates identified by the mouse 12.

These interfacing functions enable the operation information processing DLL 15 to provide minimum requisite functions to acquire video data to be reproduced, switch video scenes, and to process a user operation on the video image.

The following is a description of a process in the operation information processing DLL 15 for identifying the name indicative of a subject on which the user has clicked on the video screen, that is, a subject identifier.

Figure 4:
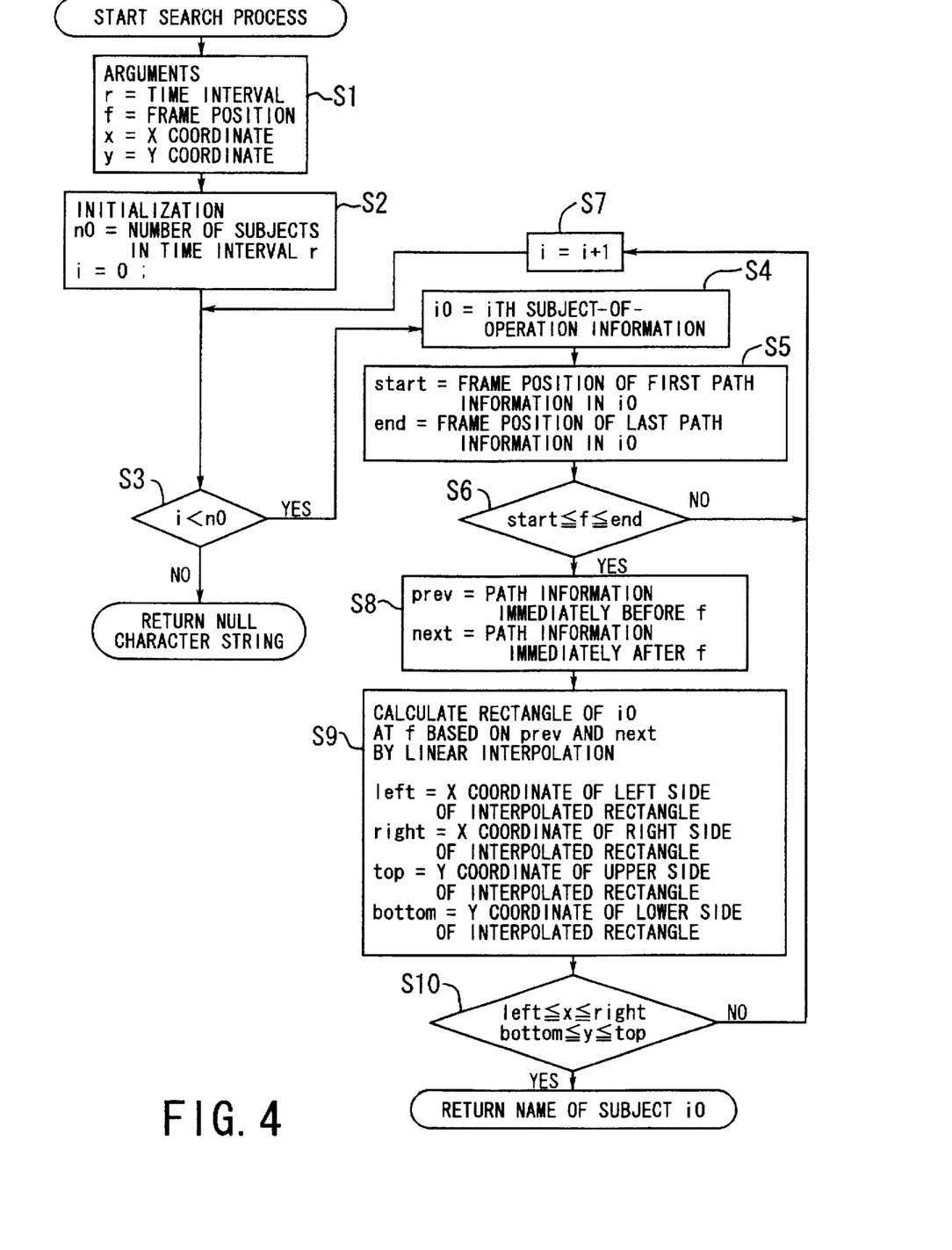
FIG. 4 is a flowchart showing the flow of a path information search process.

FIG. 4 illustrates the flow of a path information search process.

In the path information search process, first, the presentation control script/interpreter 14 supplies the operation information processing DLL 15 with arguments which include a time interval r specifying a currently reproduced scene, a frame position f acquired from the video driver 13, and X and Y coordinates x, y given from the mouse 12, together with the video operation information specifying which video data is currently reproduced (Step S1). To carry out a loop process as initialization for searching for all of the subjects in the time interval r, the number n0 of subjects recorded in the time interval r is set and subject-of-operation information i is set to "0" (Step S2). Then, the number n0 of subjects is compared with the subject-of-operation information i (Step S3). If i<n0 is fulfilled, the ith subject-of-operation information is set as i0 (Step S4), and the frame position of the first path information in i0 and the frame position of the last path information in i0 are set as "start" and "end", respectively (Step S5). It is then determined whether or not the frame position f being searched for exists between the frame position of the first path information and the frame position of the last path information (Step S6). If the frame position f does not exist between the frame position of the first path information and that of the last path information, i is incremented so that the process may be performed on the subsequent subject-of-operation information (Step S7), and the flow returns to Step S3.

On the other hand, if the frame position f exists between the frame position of the first path information and that of the last path information, the path information immediately preceding the frame position f and the path information immediately succeeding the same are set as "prev" and "next", respectively (Step S8), the contour of i0 (in this example, it is assumed that the contour of the subject is a rectangle) at f is calculated based on "prev" and "next", and in this rectangle, the X coordinate of the left side, the X coordinate of the right side, the Y coordinate of the upper side, and the Y coordinate of the lower side are set as "left", "right", "top" and "bottom", respectively (Step S9). The method of obtaining the contour will be described later. Subsequently, it is determined whether or not the screen coordinates x, y located by the mouse 12 fall within the range of the rectangle (Step S10). If the screen coordinates x, y identified by the mouse 12 are contained in the rectangle, the name of the subject i0 in the subject-of-operation information is returned, and if the screen coordinates do not exist in the rectangle, the flow returns to Step S7 to make a comparison with the next subject-of-operation information. If i=n0 is fulfilled in Step S3, then it means that there is no matching subject-of-operation information and the subject of operation selected with the mouse is judged to be not recorded as subject-of-operation information as a result of the area search with respect to all subject-of-operation information in the time interval concerned; therefore, a null character string is returned.

The following is a description of an example of calculating contour information based on the path information defining the subject of operation at frame positions before and after the frame position which has been located.

Figure 5:
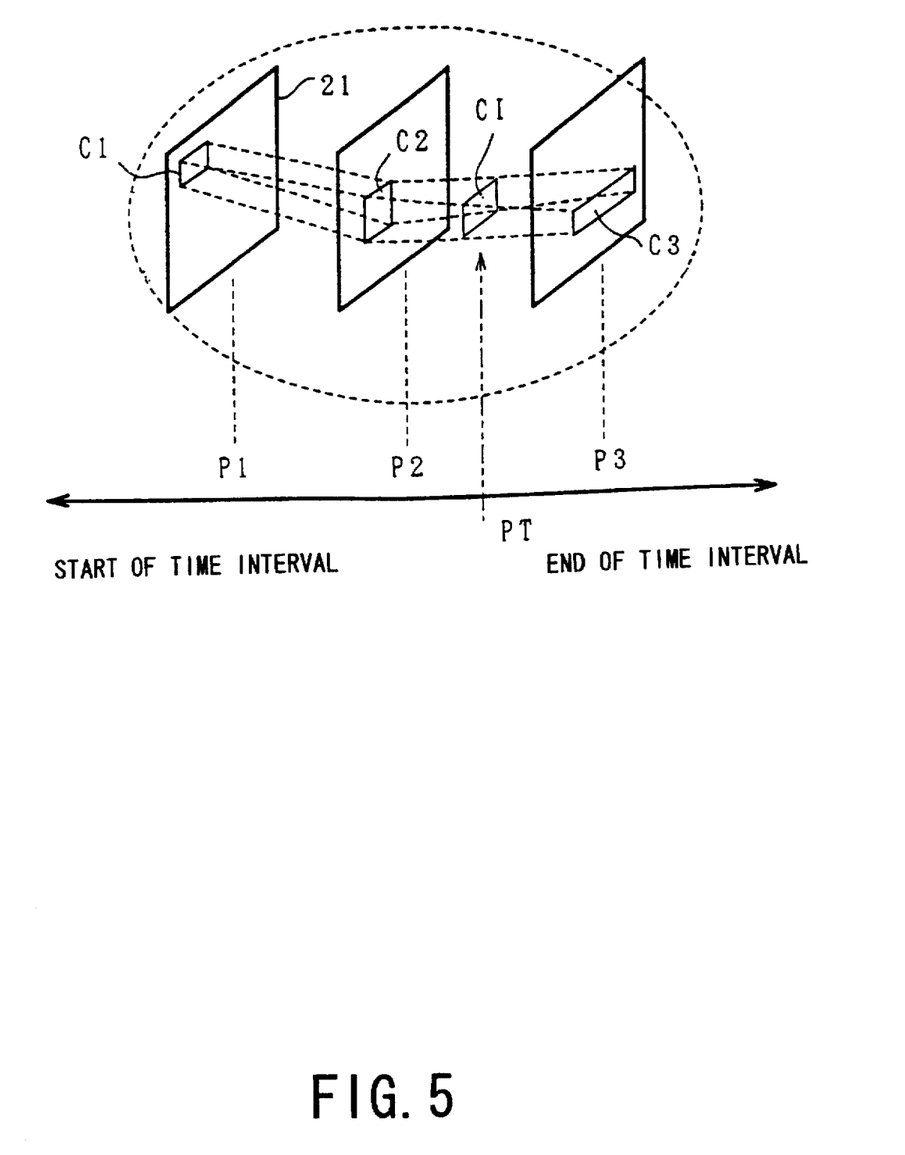
FIG. 5 is a diagram illustrating a method of obtaining contour information by linear interpolation.

FIG. 5 illustrates a method of obtaining contour information by linear interpolation.

In FIG. 5, a video display area indicated at 21 usually includes several subjects of operation; however, for simplicity of illustration, it is assumed that only one subject is present in the video display area 21. The contour of this subject of operation is defined, for example, as a rectangular shape at each of transitional phases of motion of the subject. Since the position and size of the subject in the video display area 21 change with time, a contour that matches the motion is defined for the subject at a transitional phase of its motion. FIG. 5 shows a change of the contour of one subject which has transitional phases of motion at frame positions P1, P2 and P3 in a certain scene of video data, and the contours in these frame positions are indicated at C1, C2 and C3, respectively. The contours C1, C2 and C3 are defined in the respective ones of path information which constitute the subject-of-operation information.

When the mouse is operated by the user at a certain frame position PT, the transitional-phase frames before and after this frame, in the illustrated example, the frames at the frame positions P2 and P3 preceding and succeeding the frame position PT, respectively, are located and the contours C2 and C3 are obtained from the path information associated with the respective frames. In the case where the contour is in the form of a rectangle, the information about the contours C2 and C3 is defined, for example, by X coordinates of the right and left sides of the rectangle and Y coordinates of the upper and lower sides of the rectangle. From these coordinates, the coordinates of the four corners of each of the contours C2 and C3 can be obtained; therefore, each pair of the corresponding corners are connected by a straight line, and a contour formed by the four points lying on the respective straight lines at the frame position PT is derived as an interpolated contour CI. By making a determination as to whether or not the screen coordinates fall within the interpolated contour CI thus obtained by linear interpolation, it is possible to identify the subject of operation specified by the user.

Figure 6:
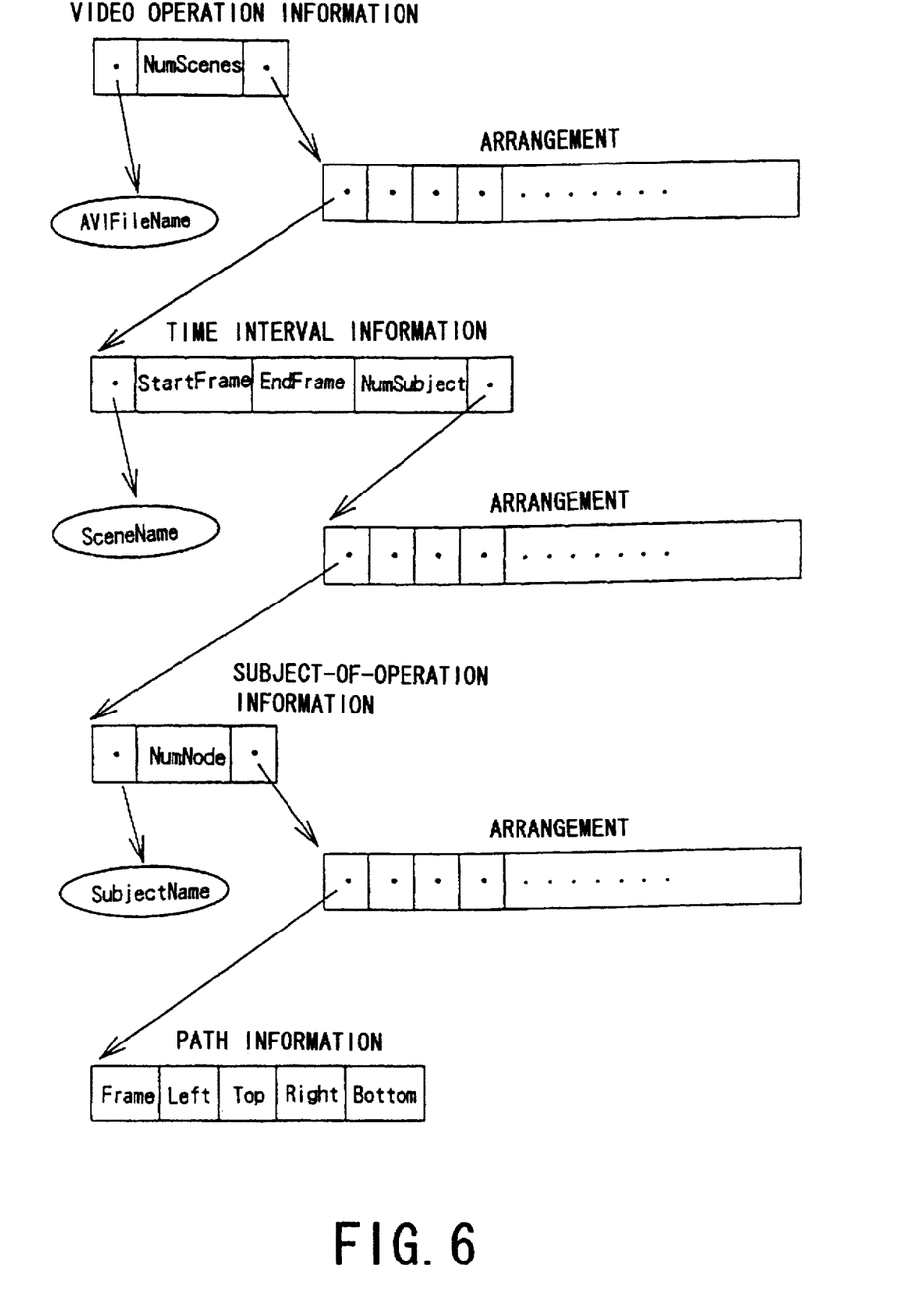
FIG. 6 is a diagram showing the data structure of video operation information.

Lastly, the data structure of the video operation information constituting the operation information aggregate 16a will be explained.

FIG. 6 illustrates the data structure of the video operation information.

The video operation information retains a video data identifier specifying video data linked to this information, that is, the name of an AVI file (AVIFileName), the number of scenes recorded in this video operation information, that is, the number of time intervals (NumScenes), and a list or arrangement of time interval information for managing the information about the time intervals set in this video data.

Each time interval information retains a time interval identifier (SceneName) for discriminating this time interval from other time intervals, a frame number (StartFrame) specifying the start of this time interval, a frame number (EndFrame) specifying the end of this time interval, the number (NumSubject) of pieces of subject-of-operation information recorded in this time interval, and a list or arrangement of subject-of-operation information for managing the information about the subjects of operation in this time interval which are sensitive to user operation.

Each subject-of-operation information retains an identifier (SubjectName) specifying the subject concerned, the number (NumNode) of pieces of path information included in this subject, and a list or arrangement of path information describing how the subject changes its position with time in the video data.

Each path information retains a frame number (Frame) indicative of a time-position specifying which frame position information in the motion of the subject this path information describes, and contour information describing the contour of the subject at this frame position, that is, a list or arrangement including the left-side coordinate (Left), upper-side coordinate (Top), right-side coordinate (Right) and lower-side coordinate (Bottom) of the rectangle which the subject occupies in this frame. Although in this example, the contour is rectangular in shape, it may alternatively be defined as some other polygon. In the case where the contour has the shape of a polygon other than rectangle, the contour information is retained in the form of a list or arrangement including the coordinates of the vertices of the polygon.

Thus, the subject-of-operation information need not be set with respect to each frame of video data and may be set for each transitional phase of motion of the subject, whereby the amount of information associated with video operation is reduced, permitting faster event processing.

Although the foregoing embodiment employs linear interpolation as a method of obtaining contour information at a frame position for which no path information is defined, another interpolation method may alternatively be employed. Further, in the above embodiment is described the case where the time interval information is set in the video data for each scene to permit discrimination between the scenes, but the time interval information is not essential information because a frame position in the video data can be specified by the frame number alone.

As described above, the present invention has a construction such that the frame position of video data currently reproduced by the video driving/processing means and the screen coordinates of a subject of operation specified by the coordinates specifying device are obtained, the object or the subject of operation is detected based solely on the frame position and the screen coordinates, and potential subjects to be specified by the user are stored as separate data in association with frame positions of the video data. Accordingly, a subject of operation in video data can be linked to an action associated therewith, without the need to modify motion video data at all, thereby facilitating the linkage with various presentation systems.

When detecting a subject of operation, a time interval which is defined with respect to each scene can be specified, in which case only the time interval need be located, permitting high-efficiency, high-speed switching of scenes in the same video data. The subject-of-operation information in the video operation information retaining means has only to be set for each transitional phase of motion of the subject, and undefined subject-of-operation information at a frame position between the transitional phases can be obtained by interpolating the subject-of-operation information at frame positions before and after the frame position concerned. Thus, the size of information can be drastically reduced because the setting for each video frame is unnecessary, and the system is applied with no much load even if the subject-of-operation information is loaded into memory. Further, since the video operation information processing means has no dependence on a specific video data format or the video driving/processing means, it is highly independent and can be easily linked with various applications.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A video presentation system which includes video driving/processing means for carrying out a process for displaying video data at a video display unit, a coordinates specifying device used by a user to specify a subject of operation such as an object in a video image, and presentation controlling/processing means for carrying out processes including a switching to a scene relating to the subject of operation specified by the coordinates specifying device, the video presentation system comprising:

video operation information retaining means for retaining subject-of-operation information defining subjects of operation to be handled by the user on video images corresponding to the video data; and video operation information processing means for searching the subject-of-operation information for a subject of operation handled by the user, based on a frame position of the video data currently reproduced by the video driving/processing means and screen coordinates of the subject of operation specified by the coordinates specifying device, to thereby detect the subject of operation handled by the user.

2. The video presentation system according to claim 1, wherein said video operation information processing means includes means for loading contents of a file, which stores video data to be presented and user operation information associated with the video data, into said video operation information retaining means and removing the loaded information, means for acquiring information specifying video data to be reproduced by the video driving/processing means from said video operation information retaining means, and means for identifying a subject of operation which has been specified by a user operation on a video image by analyzing the subject-of-operation information retained by said video operation information retaining means based on the screen coordinates specified by the coordinates specifying device and the frame position of the video image currently reproduced by the video driving/processing means, and for acquiring a name of the subject of operation.

3. The video presentation system according to claim 2, wherein said video operation information processing means further includes means for acquiring, from said video operation information retaining means, information about a time interval which indicates a time-position within the video data of a scene including a frame of the video data currently reproduced by the video driving/processing means.

4. The video presentation system according to claim 1, wherein the video operation information retained by said video operation information retaining means includes a video data identifier specifying video data, and a list or arrangement of time interval information for managing information defining each of intervals obtained by subdividing the video data; the time interval information includes a time interval identifier for discriminating a time interval thereof from other time intervals, frame positions indicating start and end, respectively, of the time interval in the video data, and a list or arrangement of subject-of-operation information for managing information about subjects of operation to be handled by the user in the time interval and continuous, time-varying motions of the subjects on video images in the time interval; the subject-of-operation information includes an identifier for specifying in the video data a subject of operation which is described in the subject-of-operation information, and a list or arrangement of path information for managing information about contours of the subject of operation at certain points of time in the video data; and the path information includes a frame position described therein, and a list or arrangement of contour information including vertices of a polygon representing a contour of an area which the subject of operation occupies in the video image at the frame position.

* * * * *